(12) United States Patent
Kimura et al.

(10) Patent No.: US 8,537,405 B2
(45) Date of Patent: Sep. 17, 2013

(54) CONTROLLER, CONTROL APPARATUS, AND IMAGE-FORMING APPARATUS

(75) Inventors: Hideo Kimura, Kanagawa (JP); Naoki Hirako, Kanagawa (JP); Keita Kumokiri, Kanagawa (JP); Shun Kuwahara, Kanagawa (JP); Hiroyuki Funayama, Kanagawa (JP); Izumi Suda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 812 days.

(21) Appl. No.: 12/637,238

(22) Filed: Dec. 14, 2009

(65) Prior Publication Data
US 2010/0328710 A1 Dec. 30, 2010

(30) Foreign Application Priority Data
Jun. 25, 2009 (JP) .................................. 2009-151176

(51) Int. Cl.
G06F 15/00 (2006.01)
(52) U.S. Cl.
USPC ........ 358/1.16; 358/1.15; 358/1.14; 713/320; 713/323; 713/330
(58) Field of Classification Search
USPC .............. 358/1.14, 1.15, 1.16; 713/320, 323, 713/330
See application file for complete search history.

(56) References Cited

U.S. PATENT DOCUMENTS

| 8,213,026 B2* | 7/2012 | Sugiyama | 358/1.1 |
| 2004/0136031 A1* | 7/2004 | Narukawa | 358/1.15 |
| 2008/0170257 A1* | 7/2008 | Fukuda | 358/1.15 |
| 2009/0323120 A1* | 12/2009 | Yamanaka | 358/1.16 |

FOREIGN PATENT DOCUMENTS

| JP | 10-222430 | 8/1998 |
| JP | 2005-043531 A | 2/2005 |

OTHER PUBLICATIONS

Japanese Office Action issued on Jun. 25, 2013 in Japanese Application No. 2009-151176.

* cited by examiner

*Primary Examiner* — King Poon
*Assistant Examiner* — Lawrence Wills
(74) *Attorney, Agent, or Firm* — Sughrue Mion, PLLC

(57) ABSTRACT

A controller includes: a sub-control substrate that includes a first memory storing first control information to be used for controlling at least one of a plurality of modules of a processing apparatus, and controls the at least one of the plurality of modules by using the stored first control information while the controller is connected to the processing apparatus; and a main control substrate that includes a second memory and controls an operation of the sub-control substrate; and wherein: if a first operation is performed, the main control substrate acquires second control information that is to be used for controlling at least one of the plurality of modules and is determined from the first control information, and stores the acquired second control information in the second memory, when the controller is connected to the processing apparatus, and a second operation is performed, the main control substrate supplies the second control information stored in the second memory to another controller included in the processing apparatus, and stores the second control information in the another controller.

8 Claims, 4 Drawing Sheets

CONTROLLER, CONTROL APPARATUS, AND IMAGE-FORMING APPARATUS

CROSS-REFERENCE TO RELATED APPLICATIONS

This application is based on and claims priority under 35 USC 119 from Japanese Patent Application No. 2009-151176 filed on Jun. 25, 2009.

BACKGROUND

1. Technical Field

The present invention relates to a controller, a control apparatus, and an image-forming apparatus.

2. Related Art

Among image-forming apparatuses, for example, there are those that realize multiple functions, such as an image forming function of forming an image, an image reading function of reading an image, or a communications function of performing communications. In such a multifunction image-forming apparatus, operation of circuits, components, or apparatuses (hereinafter, collectively referred to as "modules") that realize the respective functions are controlled based on control information stored in an integrated circuit or in a memory provided in a control substrate.

SUMMARY

According to an aspect of the invention, there is provided a controller including: a sub-control substrate that includes a first memory storing first control information to be used for controlling at least one of a plurality of modules of a processing apparatus, and controls the at least one of the plurality of modules by using the stored first control information while the controller is connected to the processing apparatus; and a main control substrate that includes a second memory and controls an operation of the sub-control substrate; and wherein: if a first operation is performed, the main control substrate acquires second control information that is to be used for controlling at least one of the plurality of modules and is determined from the first control information, and stores the acquired second control information in the second memory, when the controller is connected to the processing apparatus, and a second operation is performed, the main control substrate supplies the second control information stored in the second memory to another controller included in the processing apparatus, and stores the second control information in the another controller.

BRIEF DESCRIPTION OF THE DRAWINGS

Exemplary embodiment of the present invention will be described in detail based on the following figures, wherein.

DETAILED DESCRIPTION

Following is a description of an exemplary embodiment of the present invention, with reference to the drawings.

(1) Configuration

Figure 1:
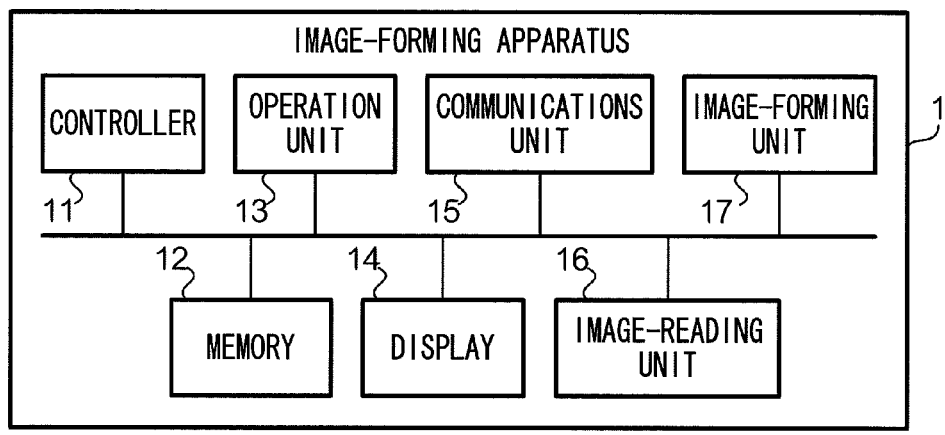
FIG. 1 is a block diagram that shows the configuration of an image-forming apparatus 1 according to an exemplary embodiment of the present invention.

FIG. 1 is a block diagram that shows the configuration of an image-forming apparatus 1. Image-forming apparatus 1 is a device in which, in order to form an image on a recording medium such as a recording paper using a color material such as a toner, and read an image formed on the recording medium, functions such as printing and scanning, for example, are consolidated. Image-forming apparatus 1 includes a controller 11, a memory 12, an operation unit 13, a display 14, a communications unit 15, an image-reading unit 16, and an image-forming unit 17. Controller 11 is an example of a control apparatus, and includes a CPU (Central Processing Unit), a ROM (Read Only Memory), a RAM (Random Access Memory), and an ASIC (Application Specific Integrated Circuit). Controller 11 controls each part of image-forming apparatus 1 by the CPU executing programs stored in the ROM or memory 12.

Memory 12 is a non-volatile storage apparatus such as an HD (Hard Disk), and stores various programs and data. Operation unit 13 includes a power switch and multiple keys, is operated by a user, and supplies a signal corresponding to that operation to controller 11. Display 14 includes a VRAM (Video RAM), a liquid crystal display, and a liquid crystal driving circuit, and based on information supplied from controller 11, displays processing progress status, information providing operational guidance to the user, and so forth. Communications unit 15 includes a communications circuit and a communications interface, and performs sending of information to and receiving of information from an external apparatus such as a personal computer via a communications network such as WAN (Wide Area Network) or LAN (Local Area Network) (not shown). Image-reading unit 16 includes an optical system member configured from a CCD (Charge Coupled Device), and reads an image formed on a recording medium by way of the optical system member and generates image data for the image that is read. Image-forming unit 17 includes a photosensitive drum serving as an image holder, an exposing unit that forms an electrostatic latent image on the photosensitive drum, a developing unit that develops the electrostatic latent image to form a toner image, a transfer unit that transfers the toner image to a recording medium, and a fixing unit that then fixes the transferred toner image on the recording medium.

Memory 12, operation unit 13, display 14, communications unit 15, image-reading unit 16, and image-forming unit 17 respectively realize a function of storing information, a function of inputting a signal according to operation, a function of displaying information, a function of sending/receiving information, a function of reading an image and generating image data, and a function of forming an image on a recording medium. Below, when it is not necessary to give a specialized description of an individual function, memory 12, operation unit 13, display 14, communications unit 15, image-reading unit 16, and image-forming unit 17 are collectively referred to as "modules." In other words, these modules perform a multiple processes including a process of forming an image on a recording medium.

Figure 2:
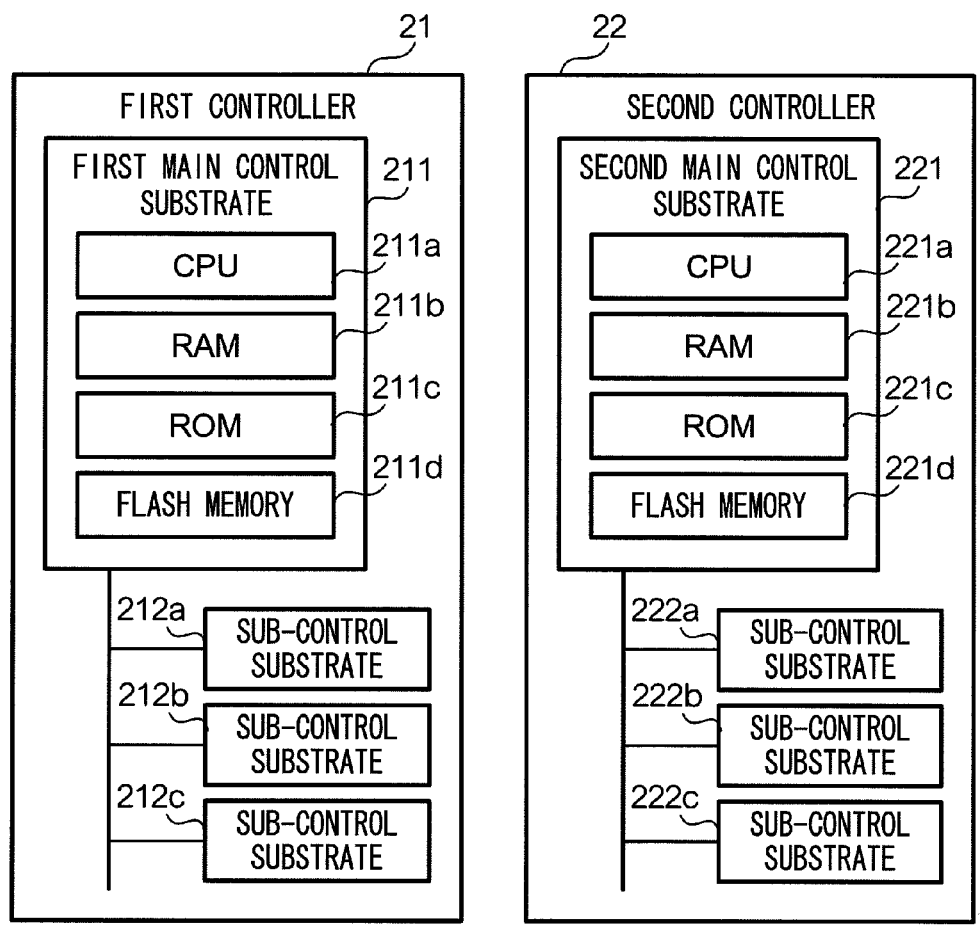
FIG. 2 is a block diagram that shows the configuration of a controller 11 according to the same exemplary embodiment.

FIG. 2 is a block diagram that shows the configuration of controller 11. Controller 11 includes a first controller 21 and a second controller 22, first controller 21 and second controller 22 being connected by a bus (not shown) or the like. In first controller 21, a first main control substrate 211 is connected to sub-control substrates 212a to 212c (an example of a first sub-control substrate) by connectors (not shown) on a motherboard. In second controller 22, a second main control substrate 221 is connected to sub-control substrates 222a to 222c (an example of a second sub-control substrate) by connectors (not shown) on a motherboard. That is, first controller 21 and second controller 22 are configured so as to each be capable of connection to or separation from image-forming apparatus 1.

First main control substrate 211 is an integrated circuit that, other than controlling operation of sub-control substrates 212a to 212c, also controls operation of second main control substrate 221. First main control substrate 211 includes a CPU 211a, a RAM 211b, a ROM 211c, and a flash memory 211d (an example of a second memory). CPU 211a controls operation of sub-control substrates 212a to 212c and operation of second main control substrate 221, by CPU 211a executing programs stored in ROM 211c. That is, first main control substrate 211 is an example of a main control substrate that controls operation of sub-control substrates.

Second main control substrate 221 is an integrated circuit that controls operation of sub-control substrates 222a to 222c, and includes a CPU 221a, a RAM 221b, a ROM 221c, and a flash memory 221d. CPU 221a controls operation of sub-control substrates 222a to 222c by CPU 221a executing programs stored in ROM 221c. That is, second main control substrate 221 is an example of a main control substrate that controls operation of sub-control substrates.

Sub-control substrates 212a to 212c are integrated circuits that each includes a memory (an example of a first memory) and control operation of a control target module, based on control information (an example of first control information) stored in respective memories of those sub-control substrates 212a to 212c. Also, Sub-control substrates 222a to 222c are integrated circuits that each includes a memory (an example of a third memory) and control operation of a control target module, based on control information (an example of second control information) stored in respective memories of those sub-control substrates 222a to 222c. For example, sub-control substrate 212a controls memory 12 as a control target, sub-control substrate 212b controls image-forming unit 17 as a control target, sub-control substrate 212c controls display 14 as a control target, sub-control substrate 222a controls communications unit 15 as a control target, sub-control substrate 222b controls operation unit 13 as a control target, and sub-control substrate 222c controls image-reading unit 16 as a control target. Also, control information when, for example, the control target module is image-forming unit 17 includes control parameters related to image forming speed or toner density when forming an image on a recording medium, a speed of carrying the recording medium, and so forth.

On the other hand, control information stored in respective memories of the sub-control substrates 212a to 222c may affect each other. For example, control information stored by sub-control substrate 212b, which controls image-forming unit 17, may affect control information stored by sub-control substrate 222c, which controls image-reading unit 16. In this case, when control information stored by sub-control substrate 212b, which controls image-forming unit 17, is determined, control information stored by sub-control substrate 222c, which controls image-reading unit 16, is also determined. More specifically, with respect to how control information is determined, first controller 21 functions as a so-called master (main) relative to second controller 22, and second controller 22 functions as a slave (sub) relative to first controller 21.

Consequently, these units of control information are adjusted when shipped from a manufacturer such that a control target module satisfies predetermined performance requirements for a combination of first controller 21 and second controller 22, which together constitute controller 11. However, where control information is adjusted for a combination of first controller 21 and second controller 22 when shipped from the manufacturer, a possibility exists that if a fabrication error occurs, or component exchange or the like takes place the combination of first controller 21 and second controller 22 may be changed during a period that a complete image-forming apparatus including first controller 21 and second controller 22 is stored in a warehouse, transported to a location of an end user (shipment destination), and assembled. Also, in a case of delivering multiple image-forming apparatuses 1 to a shipment destination, a possibility exists that there may be installed into an image-forming apparatus 1 a combination of first controller 21 and second controller 22 that is different from a specified combination of first controller 21 and second controller 22 at a time of shipment. In a case where such a change in combination of first controller 21 and second controller 22 takes place, and control information stored in first controller 21 and second controller 22 is not accordingly adjusted, predetermined control target module performance requirements will not be satisfied, and there will arise a risk of fault or failure of an apparatus in which the controllers are provided. For example, in a case that control information stored in a memory of sub-control substrate 212b, which controls image-forming unit 17, and control information stored in a memory of sub-control substrate 222c, which controls image-reading unit 16 in accordance with an adjustment made at a time of shipment, determination of the control information stored in the memory of sub-control substrate 212b enables the control information stored in the memory of sub-control substrate 222c to also be determined. However, if sub-control substrate 222c is substituted for a sub-control substrate different to that in place at a time of adjustment, adjusted control information will no longer be correct, thereby giving rise to a risk of fault or failure of the apparatus in which the controllers are provided.

(2) Operation

Next follows a description of operation of an exemplary embodiment.

It is to be noted that in the following description where it is not necessary to distinguish between respective sub-control substrates 212a to 222c are collectively referred to as "sub-control substrates."

As described above, image-forming apparatus 1 is shipped from a manufacturer to a shipment destination, and at that time, it is necessary for there to be stored in a memory of each sub-control substrate, control information that has been adjusted using a testing apparatus described below such that a control target module satisfies predetermined performance requirements. Following is a description of an operation where control information is stored in a memory of each of a sub-control substrate.

Figure 3:
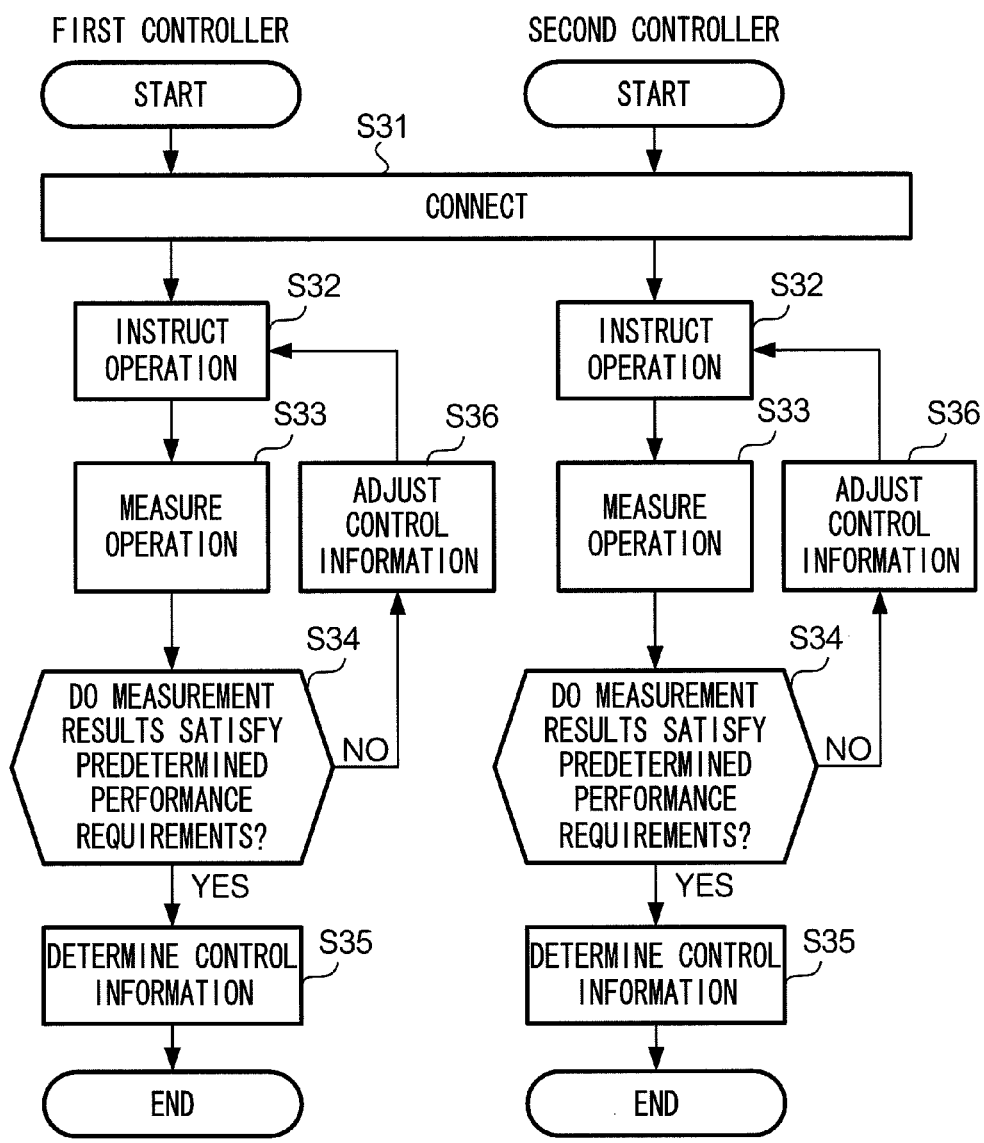
FIG. 3 is a sequence diagram that illustrates an operation to store control information in a memory of a sub-control substrate according to the same exemplary embodiment.

FIG. 3 illustrates an operation of storing control information in respective memories of sub-control substrates. First, in order to calculate control information such that the control target module satisfies predetermined performance requirements, first controller 21 and second controller 22, which constitute controller 11, are connected to a testing apparatus (Step S31). The apparatus used is one that has a module configuration that is the same as that of image-forming apparatus 1, and whereby connected first controller 21 and second controller 22 are able to control an operation of each module.

Next, operation unit 13 is operated to instruct each module included in the testing apparatus to execute operations in a predetermined pattern (Step S32). Respective CPUs of first controller 21 and second controller 22 cause the respective sub-control substrates to control operation of the corresponding modules according to instructions that have been input from operation unit 13. In the respective memories of the sub-control substrates there is stored, in advance, a default value of the control information, and a control operation of each module is carried out in accordance with the default value of the control information. For example, assuming that operation unit 13 is operated to instruct image-forming unit 17 that a toner density is 100% upon formation of an image on a recording medium, a sub-control substrate that controls image-forming unit 17 with reference to control information stored in a memory of the sub-control substrate specifies values for an exposure strength, toner amount, and so forth corresponding to a toner density of 100%, and controls image-forming unit 17 according to those values to form an image on the recording medium.

Next, operation results of each module are measured using a variety of measurement devices or manually by a human through the five senses, or the like (Step S33). For example, when instructing the image-forming unit 17 to print, a speed at which an image is formed on the recording medium, or a density of toner formed on the recording medium is measured, and from results of such measurement it is determined whether an operation of each module satisfies predetermined performance requirements (Step S34). If it is determined that the requirements are not satisfied (Step S34; NO), operation unit 13 is operated to adjust control information stored in the respective memories of the sub-control substrates (Step S36), and each operation is once again executed in the predetermined pattern (Step S32). On the other hand, when it is determined that the requirements are satisfied (Step S34; YES), the control information to be stored in the respective memories of the sub-control substrates is determined (Step S35). By the above procedures, control information that satisfies predetermined performance requirements is determined for each of a combination of first controller 21 and second controller 22 that constitute controller 11, and the information is stored in the respective memories of the sub-control substrates.

After storage of control information in the respective memories of the sub-control substrates, first controller 21 and second controller 22 are removed from the testing apparatus for shipment with image-forming apparatus 1. However, as described above, there is a possibility that first controller 21 and second controller 22, which constitute controller 11, may not be installed at the shipment destination in the combination set prior. Consequently, it is necessary to adopt a configuration for image-forming apparatus 1 in which a control target module can be controlled with control information adjusted such that predetermined performance requirements are satisfied even if a combination of first controller 21 and second controller 22 as set prior is changed subsequent to shipment.

As an operation for realizing this object, there is described below an operation in which CPU 211a of first main control substrate 211 stores (saves) the control information stored in each sub-control substrate included in second controller 22 to flash memory 211d of first main control substrate 211.

Figure 4:
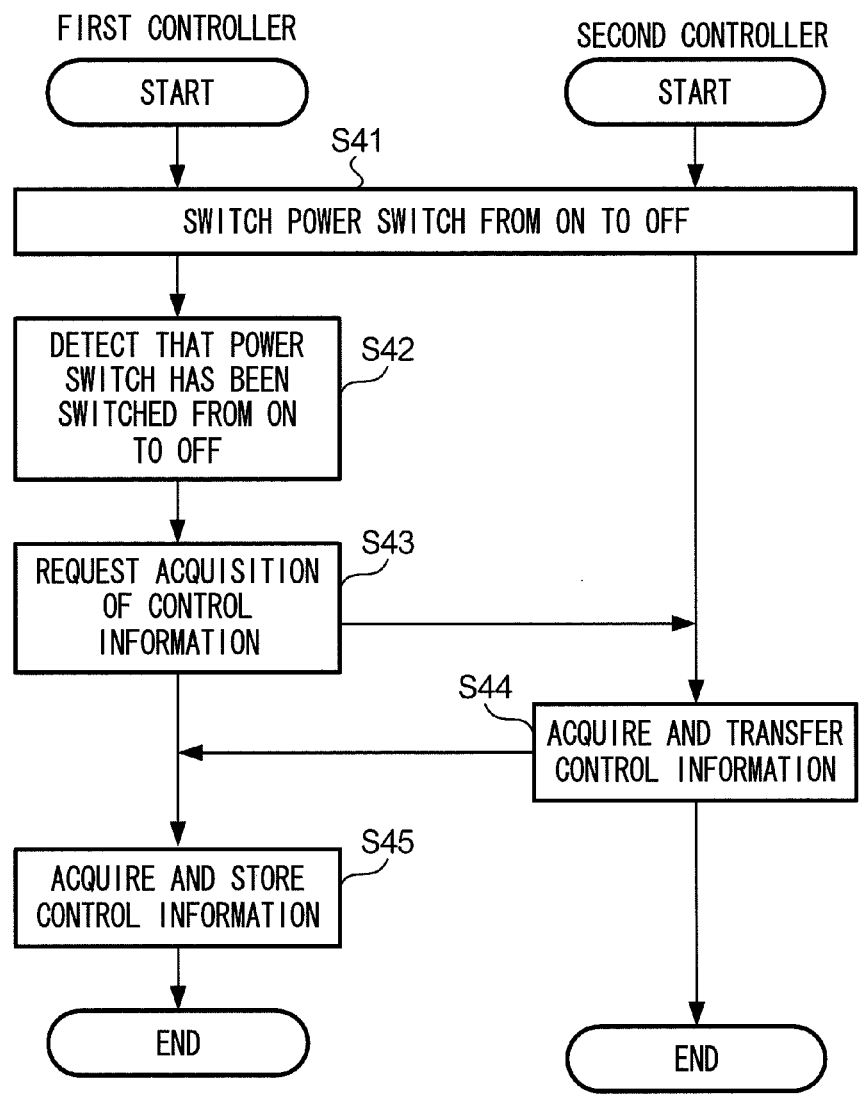
FIG. 4 is a sequence diagram that illustrates an operation to save control information according to the same exemplary embodiment.

FIG. 4 is a sequence diagram that illustrates an operation to save control information. When an operation to store control information in the memory of each sub-control substrate in Step S35 in FIG. 3 is completed, there is carried out as an example of a first operation switching of the power switch of the operation unit 13 from ON to OFF (Step S41). Here, controller 11 does not instantly turn off power, but rather, starts a preset processing for turning off power. First, CPU 211a of first main control substrate 211, in response to an operation to interrupt power supply to image-forming apparatus 1, detects that the power switch has been switched from ON to OFF (Step S42). Next, CPU 211a of first main control substrate 211 executes a program stored in ROM 211c to make a request to CPU 221a of second main control substrate 221 for the control information stored in the respective memories of sub-control substrates 222a to 222c (Step S43). In accordance with the request, CPU 221a of second main control substrate 221, acquires the control information stored in the respective memories of sub-control substrates 222a to 222c, and transfers the acquired control information to first main control substrate 211 (Step S44). When control information is acquired from CPU 221a of second main control substrate 221, CPU 211a of first main control substrate 211 stores the control information in flash memory 211d of first main control substrate 211 (Step S45). At this time, CPU 211a of first main control substrate 211 stores not only control information, but also stores in flash memory 211d information that identifies a sub-control substrate controlling a module in which control information is stored (referred to below as identification information). Accordingly, in flash memory 211d of first main control substrate 211, multiple items of control information are stored associated with the sub-control substrates in the respective memories of which the items of control information are stored. Subsequently, power supplied to the testing apparatus is turned off.

As described above, the first operation of the power switch being switched from ON to OFF serves as a trigger for the control information stored in the respective memories of sub-control substrates 222a to 222c of second controller 22 to be stored in flash memory 211d of first controller 21. First controller 21 and second controller 22 are shipped from the manufacturer to the shipment destination in this state.

Figure 5:
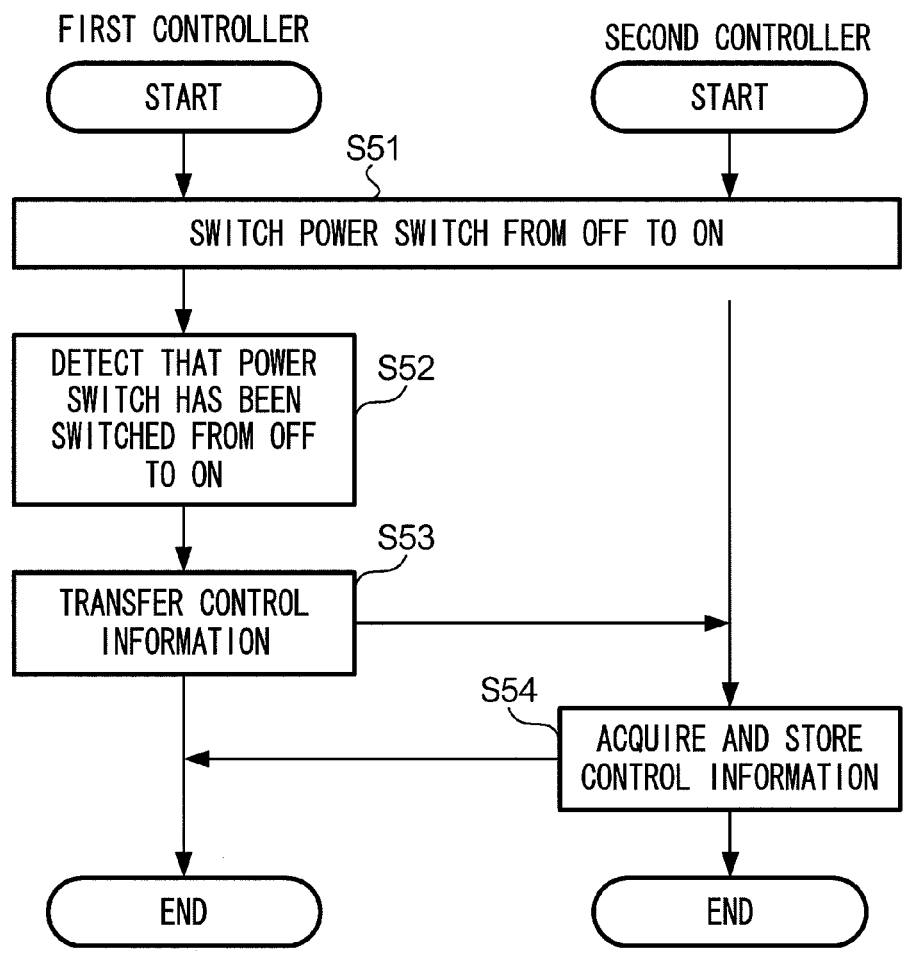
FIG. 5 is a sequence diagram that illustrates an operation to store control information in a memory of sub-control substrates according to the same exemplary embodiment.

Upon installation of image-forming apparatus 1 at the shipment destination, first controller 21 and second controller 22 are connected to image-forming apparatus 1, and CPU 211a of first main control substrate 211 performs operations as shown in FIG. 5.

Following completion of installation of image-forming apparatus 1, a second operation is carried out to switch the power switch of operation unit 13 from OFF to ON (Step S51). In response to such an operation to start a supply of power to image-forming apparatus 1, power is supplied to image-forming apparatus 1 from a commercially available power supply, and CPU 211a of first main control substrate 211 detects that the power switch has been switched from OFF to ON (Step S52). Next, CPU 211a of first main control substrate 211 reads out the control information and the identification information stored in flash memory 211d of first main control substrate 211, transfers these items of information to CPU 221a of second main control substrate 221, and instructs that these items of information be stored in a memory of a sub-control substrate (Step S53). In response to this instruction, CPU 221a of second main control substrate 221, based on the identification information, specifies the sub-control substrate memory in which to store the control information, and stores the control information in the memory of the specified sub-control substrate (Step S54).

As described above, with the second operation of the power switch being switched from OFF to ON serving as a trigger, the control information saved in flash memory 211d is restored to the memory of the respective appropriate sub-control substrates. That is, even if, for example, second controller 22 at the time of shipment is changed to a different second controller 22 within a period of time during which power is turned off at the manufacturer until installation at the shipment destination, the control information of second controller 22, which is content corresponding to first controller 21, is stored in the respective memories of sub-control substrates 222a to 222c when image-forming apparatus 1 is actually installed. Accordingly, when the respective modules of the image-forming apparatus operate, the second controller controls operation of the respective modules according to the control information corresponding to the first controller.

Note that the control information saving and restoring operations as described above are also performed when an individual responsible for maintenance of image-forming apparatus 1 switches the power switch of operation unit 13 ON/OFF. Such an operation is described below.

For example, it is assumed that an individual responsible for maintenance turns the power switch to OFF when image-forming apparatus 1 is not used for a long time, or when a maintenance check is to be carried out. In this case also, CPU 211a of first main control substrate 211 detects that the power switch has been switched from ON to OFF, and stores the control information stored in the respective memories of the sub-control substrates of second controller 22 and identification information in flash memory 211d. Conversely, when an individual responsible for maintenance switches the power switch to ON when starting to use the image-forming apparatus 1, or when a maintenance check has been completed, CPU 211a of first main control substrate 211 detects that the power switch has been switched from OFF to ON, and stores the control information stored in flash memory 211d in the respective memories of the sub-control substrates of second controller 22.

For example, assuming that an individual responsible for maintenance of image-forming apparatus 1 changes the control information stored in the respective memories of the sub-control substrates in the course of using image-forming apparatus 1, CPU 211a of first main control substrate 211 stores the changed control information in flash memory 211d when the power is switched to OFF, and stores the changed control information in the respective memories of the sub-control substrates of second controller 22 when the power is switched to ON. That is, even if the power is switched to OFF, the content of the control information immediately prior to a time when the power was switched from ON to OFF is preserved.

In the foregoing exemplary embodiment, when CPU 211a of first main control substrate 211 detects that the power switch has been switched from ON to OFF, it makes a request to CPU 221a of second main control substrate 221 for the control information (refer to Step S43 in FIG. 4). However, the present invention is not limited to this aspect. For example, when CPU 211a of second main control substrate 221 detects that the power switch has been switched from ON to OFF, it may supply the control information to first main control substrate 211, regardless of whether the CPU 211a of first main control substrate 211 requires the control information. By this operation, first main control substrate 211 acquires the control information.

(3) Modifications (3-1) Modified Example 1

In the foregoing exemplary embodiment, detection of a first operation or a second operation to switch the power switch of operation unit 13 to ON or OFF acts as a trigger for CPU 211a of first main control substrate 211 to store control information in flash memory 211d of first controller 21 and in the respective memories of the sub-control substrates included in second controller 22. The first operation and the second operation used as the trigger for this information storage are not limited to switching of the power switch of operation unit 13 between ON and OFF; for example, these operations may be of a different predetermined operation such as use of a key of operation unit 13, or remote operation from a terminal such as a personal computer performed via communications network (not shown) or the like.

(3-2) Modified Example 2

In the foregoing exemplary embodiment, an image-forming apparatus is the control target of controller 11, which is an example of a control apparatus. However, the control target apparatus is not limited to an image-forming apparatus. That is, the control target apparatus may be a processing apparatus that includes multiple modules that realize functions that differ from each other, and control substrates that can be respectively connected to or separated from the respective modules and control the respective modules in a state in which the respective control substrates are connected to the respective modules.

(3-3) Modified Example 3

In the foregoing exemplary embodiment, controller 11, which is an example of a control apparatus, is configured from two main control substrates, each of which include three sub-control substrates. However, the configuration of the control apparatus (controller 11) is not limited to the example described in the foregoing exemplary embodiment. Specifically, in the control apparatus (controller 11), if the master-slave relationship between the respective main control substrates is predetermined (in this exemplary embodiment, first main control substrate 211 is master, and second main control substrate 221 is slave), there may be any number of main control substrates and sub-control substrates included in the main control substrates. For example, a main control substrate predetermined to be a master may control one or more main control substrates predetermined to be slaves. Also, the master-slave relationship determined for the respective main control substrates is not limited to a single relationship. For example, relationships may be adopted such that a main control substrate A is determined to be a master for a main control substrate B, and furthermore the main control substrate B is determined to be a master for a main control substrate C.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments have been chosen and described to best explain the principles of the invention and its practical applications, thereby enabling others skilled in the art to understand the invention for use with various embodiments and with various modifications as suited to a particular use contemplated. It is intended that the scope of the invention be defined by the following claims and their equivalents.

What is claimed is:

1. A control apparatus comprising:

a first controller comprising a first sub-control substrate, a first main control substrate, and a first non-volatile memory; and a second controller comprising a second sub-control substrate and a second main control substrate, wherein the first controller is connectable to or removable from the control apparatus including a plurality of modules that realize different functions respectively, and controls the plurality of modules while the first controller is connected to the control apparatus, wherein the second controller is connectable to or removable from the control apparatus including the plurality of modules, and controls the plurality of modules while the second controller is connected to the control apparatus, wherein the first sub-control substrate stores first control information, and controls the plurality of modules by using the stored first control information, wherein the second sub-control substrate stores second control information, and controls the plurality of modules by using the stored second control information, wherein the first main control substrate controls an operation of the first sub-control substrate, wherein the second main control substrate controls an operation of the second sub-control substrate, wherein when a first operation is performed while the first controller is connected to the control apparatus, the first main control substrate acquires the second control information stored in the second sub-control substrate, and stores the acquired second control information in the first non-volatile memory, and wherein when a second operation is performed, the first main control substrate supplies the second control information stored in the first non-volatile memory to the second controller, and causes the second sub-control substrate to store the second control information.

2. The control apparatus according to claim 1, wherein:

the first operation is an operation for interrupting a power supply; and the second operation is an operation for starting a power supply.

3. An image-forming apparatus comprising:

a first controller comprising a first sub-control substrate, a first main control substrate, and a first non-volatile memory; and a second controller comprising a second sub-control substrate and a second main control substrate, wherein the first controller is connectable to or removable from the image-forming apparatus including a plurality of modules that realize different functions respectively, and controls the plurality of modules while the first controller is connected to the image-forming apparatus, wherein the second controller is connectable to or removable from the image-forming apparatus including the plurality of modules, and controls the plurality of modules while the second controller is connected to the image-forming apparatus, wherein the first sub-control substrate stores first control information, and controls the plurality of modules by using the stored first control information, wherein the second sub-control substrate stores second control information, and controls the plurality of modules by using the stored second control information, wherein the first main control substrate controls an operation of the first sub-control substrate, wherein the second main control substrate controls an operation of the second sub-control substrate, wherein when a first operation is performed while the first controller is connected to the image-forming apparatus, the first main control substrate acquires the second control information stored in the second sub-control substrate, and stores the acquired second control information in the first non-volatile memory, and wherein when a second operation is performed, the first main control substrate supplies the second control information stored in the first non-volatile memory to the second controller, and causes the second sub-control substrate to store the second control information.

4. The image-forming apparatus according to claim 3, wherein:

the first operation is an operation to interrupt a power supply to the image-forming apparatus; and the second operation is an operation to start the power supply to the image-forming apparatus.

5. The control apparatus according to claim 1, wherein the first control information and the second control information are parameters for controlling image forming.

6. The image-forming apparatus according to claim 3, wherein the first control information and the second control information are parameters for controlling image forming.

7. The control apparatus according to claim 1, wherein the first operation is performed prior to a shipment from a manufacturer, and the second operation is performed during installation at a shipment destination.

8. The image-forming apparatus according to claim 3, wherein the first operation is performed prior to a shipment from a manufacturer, and the second operation is performed during installation at a shipment destination.

* * * * *